United States Patent Office 2,913,773
Patented Nov. 24, 1959

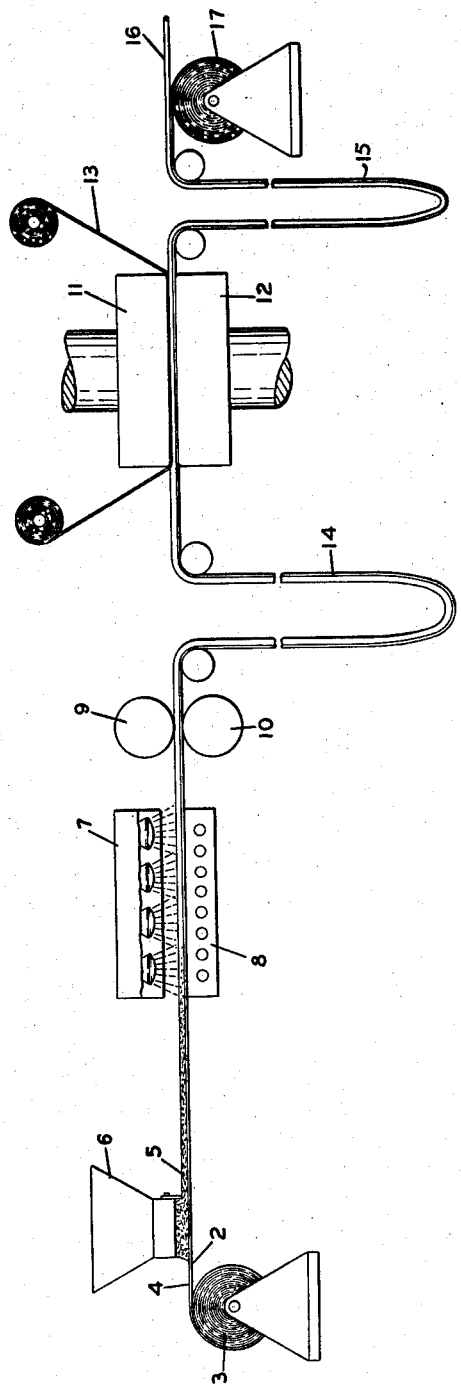
INVENTOR
LLOYD V. HASSEL
ATTORNEY

2,913,773

METHOD OF FABRICATING UNBACKED SURFACE COVERINGS

Lloyd V. Hassel, East Hempfield Township, Lancaster County, Pa., assignor to Armstrong Cork Company, Lancaster, Pa., a corporation of Pennsylvania Application November 6, 1956, Serial No. 620,652

15 Claims. (Cl. 18—59.2)

This invention relates to a method of fabricating unbacked surface coverings from vinyl compositions.

According to the invention, conventional vinyl resin surface covering composition in granulated, flake, chip, or other particulate form is deposited upon a carrier, such as dry or saturated felt, woven cotton duck or sheeting, burlap, or other material of suitable strength, which carries on its upper surface a dried methyl cellulose coating. The vinyl composition is consolidated under heat and pressure while supported on the coated carrier, preferably is then cooled, and is stripped from the carrier, the methyl cellulose serving as a parting layer between the vinyl composition and the carrier.

The carrier must be pervious to the passage of air and gases during the pressing operation to avoid the formation of blisters in the finished sheet. Coatings which otherwise would serve as separating or parting mediums but which result in low air or gas permeability cannot be used successfully. Methyl cellulose is unique in this regard, for it provides an excellent parting surface without significantly reducing the air and gas permeability of the carrier.

The attached drawing diagrammatically illustrates equipment which may be used to carry out the invention. The carrier has been shown as a web of saturated felt. Any of the felts used for plastic surface covering manufacture may be used, such as the rag and paper felts, saturated with an oleoresinous saturant or beater saturated with butadiene-styrene synthetic rubber. The felt is coated on its upper surface with methyl cellulose which may be applied as a water solution and dried. Conventional equipment, such as sprays, roll coaters, or doctor blade coaters, may be used to apply the methyl cellulose. By regulating the amount of methyl cellulose applied to the carrier, the adhesion of compositions formed thereon under heat and pressure may be controlled. During the fabrication of surface coverings, the carrier should not be completely adhesive, for difficulty may be experienced in handling the material through the various fabricating operations. Clean stripping should be provided, however, without excessively distorting the vinyl sheet or building up objectionable stresses within the sheet. Controlled adhesion of the vinyl sheet to the carrier thus may be necessary, and this can be accomplished by the present invention.

The amount of methyl cellulose applied to the carrier to produce the desired degree of adhesion will depend upon the carrier used, the nature of the vinyl composition to be formed under heat and pressure, the temperature and pressure used, the degree of adhesion desired, and other variable factors which will be readily recognized by the worker in the art and taken into consideration when the carrier is coated. For most carriers a quantity of methyl cellulose in the range of 2½ to 7 pounds, on a dry weight basis, per 100 square yards of carrier will be satisfactory.

A typical embodiment of the invention will be described to illustrate its practice.

A web of felt saturated with an oleoresinous material has applied thereto a methyl cellulose coating composition of the following formula:

*Example I*

| | Parts by weight |
|---|---|
| Methyl cellulose—10 cps | 50.00 |
| Dowicide G | 0.50 |
| Water | 349.50 |
| Total | 400.00 |

Solids content—about 12½%.

Dowicide G is a phenolic type preservative for the methyl cellulose. Its use is optional.

Any viscosity grade of methyl cellulose can be used. A 10 centipoise grade and a 25 centipoise grade have both been found to give equivalent results. With these grades, reasonably high solids contents can be made (10% to 12½%) without obtaining viscous solutions or gels.

The methyl cellulose coating may be plasticized if desired to improve flexibility. The following is an example of a plasticized coating composition:

*Example II*

| | Parts by weight |
|---|---|
| Methyl cellulose—10 cps | 50 |
| Triethylene glycol | 5 |
| Tributyl phosphate | 2 |
| Dowicide G | 2 |
| Water | 341 |
| Total | 400 |

Solids content—about 14%.

The coating is applied by a roll coater to the web of saturated felt to provide a layer of about 40 pounds per hundred square yards on the upper surface of the felt (about 5 pounds per hundred square yards on a solids basis). The coated felt 2 is supplied from a roll 3 with the methyl cellulose parting layer 4 disposed upwardly. A mass of granulated inlaying composition 5 of the following formula is deposited onto the felt 2 from a hopper 6:

*Example III*

| | Parts by weight |
|---|---|
| Vinyl chloride-vinyl acetate copolymer resin | 600 |
| Dioctyl phthalate | 100 |
| Barium ricinoleate heat stabilizer | 20 |
| Ground limestone filler | 1000 |
| Pigment | 40 |
| Total | 1760 |

The resin selected for use in Example III contains about 95% vinyl chloride and 5% vinyl acetate in the polymerization mixture. Other polymerized vinyl resins may be used as the binder or a substantial part of it, including the resins formed by polymerization of vinyl chloride alone or by copolymerization of vinyl chloride with one or more copolymerizable substances, such as the vinyl acetate mentioned above or vinylidene chloride. Mixtures of resins or one or more resins with synthetic rubber may be used also. The present invention is not concerned with the specific formulation of the vinyl composition—it is applicable to all of the polymerized vinyl resin compositions, particularly vinyl chloride resins which term includes the vinyl chloride-vinyl acetate copolymerization resins, suitable for formation into surface coverings.

The layer of composition 5 may be about 0.030" to 0.150" thick and preferably is preheated by radiant heaters 7, and a steam heated platen 8 may be provided below the felt layer 2 to prevent excessive heat loss from the composition through the felt layer. The surface of the composition 5 may be elevated to about 275° F. to 400° F. in this preheating step, and the internal temperature of the layer of composition 5 may be elevated to the range of 200° F. to 350° F. A pair of consolidating rolls 9 and 10 may be provided to press the mix onto the carrier and consolidate it sufficiently that it may be carried through the remaining fabricating operations without distortion.

The heated mass is consolidated under heat and pressure between press platens 11 and 12. The platen 11 may be heated to about 250° F. to 350° F., and the platen 12 preferably is warmed. A pressure of about 1000–1400 pounds per square inch may be applied to the composition 5 on the felt in the consolidating press, between the platens 11 and 12. (Pressures as low as 600–700 pounds may be used for some compositions.) This serves to consolidate and fuse the mass into a homogeneous layer about 0.015″ to 0.075″ thick. A sheet of press release paper 13 preferably is interposed between the face of the mix and the upper platen 11 during heat and pressure consolidation, and this is stripped from the sheet as it leaves the consolidation press.

Since the consolidating press is intermittently operated, being closed during the consolidation and fusing operations for about 5–10 seconds, and since the layer 5 is formed by moving the felt 2 continuously below the hopper 6, a dip 14 is made in the material to permit such intermittent and continuous operation at the consolidating press and the metering hopper, respectively.

After the material has been consolidated between platens 11 and 12, it may be delivered into a cooling festoon 15 and the temperature of the composition reduced, preferably to about room temperature. The carrier web 2 is then stripped from the sheet of composition which has been designated 16. The web 2 may be formed into a roll 17, as indicated in the drawing.

The product may also be formed by a calendering operation with the methyl cellulose coated carrier being fed into the nip between the calender rolls and the granulated composition being fed onto the coated surface of the carrier for consolidation into a sheet by the calender rolls.

Stripping can be done as soon as the sheet has cooled sufficiently to prevent objectionable stresses from being put into the sheet during the stripping operation. This temperature will vary with the particular composition being produced. If desired, the material may be rolled up while warm and the carrier stripped free at a later time. The carrier also may be stripped from the sheet before it has cooled to 120° F. if desired, but in such instance it may be desirable to stress relieve the sheet. Where the sheet is to be planished or calendered subsequently to the press consolidation, stripping may be effected at temperatures above 120° F., for such planishing and calendering operations will serve to stress relieve the composition.

The finished sheet may be trimmed for use as sheet flooring, may be fabricated into floor or wall tiles, trimmed to suitable width for wall covering and counter top covering uses, and died into special shapes for special purposes such as coverings for the tops of platforms on bathroom scales and for other uses.

I claim:

1. In a method of forming a loose particulated vinyl plastic mass into an unsupported sheet, the steps comprising providing between the surfaces of said loose mass and a porous carrier upon which said mass is supported a gas-pervious release layer of methyl cellulose, with said vinyl plastic mass lying in direct engagement with said methyl cellulose layer, fusing said particulated vinyl plastic mass into a homogeneous sheet by the application of heat and pressure thereto with the escape of gas through said methyl cellulose release layer and said porous carrier, discontinuing the application of pressure, and stripping the vinyl plastic sheet so formed from said carrier, said release layer of methyl cellulose facilitating said stripping.

2. In a method of forming a particulated vinyl plastic mass into an unsupported sheet, the steps comprising providing between the surface of a loose mass of particles of polymerized vinyl chloride composition and a porous carrier upon which said mass is supported a gas-pervious release layer of methyl cellulose, with said mass lying in direct engagement with said methyl cellulose layer, fusing said particulated vinyl plastic mass into a homogeneous sheet by the application of heat and pressure thereto with the escape of gas through said methyl cellulose release layer and said porous carrier, discontinuing the application of pressure, and stripping the vinyl plastic sheet so formed from said carrier, said methyl cellulose release layer facilitating said stripping.

3. In a method of forming a particulated vinyl plastic mass, the steps comprising providing between the surfaces of a mass including a vinyl plastic selected from the group consisting of (a) polyvinyl chloride, (b) copolymers of polyvinyl chloride and vinyl acetate, (c) mixtures of polyvinyl chloride and a rubberlike copolymer of butadiene and acrylonitrile, and (d) mixtures of two or more of the foregoing, and a porous carrier upon which said mass is supported, a gas-pervious release layer of methyl cellulose, fusing said particulated vinyl plastic mass into a homogeneous sheet on said carrier by the application of heat and pressure thereto with the escape of gas through said methyl cellulose release layer and said porous carrier, discontinuing the application of pressure, and stripping the formed sheet from said carrier, said methyl cellulose release layer facilitating said stripping.

4. A method in accordance with claim 3 in which said carrier is an oleoresinous saturated felt.

5. A method in accordance with claim 4 in which said release layer is of a thickness equivalent to about 5 pounds (on a dry weight basis) per hundred square yards of felt.

6. In a method of forming a mass of vinyl plastic particles into an unsupported sheet, the steps comprising providing between the surface of said mass and a porous carrier upon which said mass is supported a gas pervious release layer of methyl cellulose, with said vinyl plastic mass lying in direct engagement with said methyl cellulose release layer, fusing said particulated vinyl plastic mass into a homogeneous sheet on said carrier by the application of heat and pressure thereto, the temperature of the mass during pressing being in the order of 275° F. to 400° F., permitting gases developed during heating and pressing of said mass to escape through said gas pervious release layer of methyl cellulose, discontinuing the application of pressure, and thereafter stripping the vinyl plastic sheet so formed from said carrier, said release layer of methyl cellulose facilitating said stripping.

7. A method in accordance with claim 6 in which the vinyl plastic sheet is cooled to a temperature below about 120° F. before it is stripped from said carrier.

8. A method in accordance with claim 6 in which said vinyl plastic mass has a binder of vinyl chloride-vinyl acetate copolymer and in which said release layer of methyl cellulose is the dried residue of a water solution of methyl cellulose.

9. A method in accordance with claim 6 in which said mass is consolidated under a pressure of about 1000 to 1400 pounds per square inch.

10. A method in accordance with claim 6 in which said porous carrier is a sheet of felt impregnated with an oleoresinous saturant.

11. A method in accordance with claim 1 in which said methyl cellulose is plasticized with a chemical plasticizer.

12. A method in accordance with claim 1 in which said carrier is a felt containing a butadiene-styrene synthetic rubber saturant.

13. A method in accordance with claim 1 in which said release layer of methyl cellulose is of a thickness equivalent to 2½ to 7½ pounds (on a dry weight basis) per hundred square yards of the carrier.

14. A method in accordance with claim 1 in which the surface temperature of the mass during pressing is in the order of 275° F. to 400° F. and the pressure is greater than 600 pounds per square inch.

15. In a method of forming a particulated vinyl plastic mass into an unsupported sheet, the steps comprising depositing a loose mass of particles of polymerized vinyl chloride composition onto a porous carrier which has thereon a gas-pervious release layer of methyl cellulose, with said loose mass lying in direct engagement with said methyl cellulose layer, fusing said loose mass of particles on said carrier into a homogeneous sheet by the application of heat in the order of 250° F. to 350° F. and pressure in the order of 600 to 1400 pounds per square inch thereto while permitting gas resulting from said heating and pressing to escape through said methyl cellulose release layer and said porous carrier, after sheet formation discontinuing the application of pressure, cooling the formed sheet to a temperature below 120° F., and stripping the formed sheet from the methyl cellulose release layer on the carrier.

References Cited in the file of this patent

UNITED STATES PATENTS

| | | |
|---|---|---|
| 1,930,287 | Short et al. | Oct. 10, 1933 |
| 2,096,338 | Randall | Oct. 19, 1937 |
| 2,187,086 | Koehring | Jan. 16, 1940 |
| 2,328,333 | Freeman et al. | Aug. 31, 1943 |
| 2,559,649 | Little et al. | July 10, 1951 |
| 2,588,367 | Dennett | Mar. 11, 1952 |
| 2,704,735 | Hedges et al. | Mar. 22, 1955 |
| 2,723,962 | Hedges et al. | Nov. 15, 1955 |